J. F. MATCHET & P. W. SMITH.
Wheel-Cultivators.

No. 143,631. Patented Oct. 14, 1873.

Witnesses:
A Bennerkendorf.
C Kilgurick

Inventor:
J. F. Matchet
P. W. Smith
Per
Munn & Co
Attorneys.

AM. PHOTO-LITHOGRAPHIC CO. N.Y. (OSBORNE'S PROCESS.)

UNITED STATES PATENT OFFICE.

JAMES F. MATCHET AND PERRY W. SMITH, OF PARIS, MISSOURI.

IMPROVEMENT IN WHEEL-CULTIVATORS.

Specification forming part of Letters Patent No. 143,631, dated October 14, 1873; application filed June 7, 1873.

*To all whom it may concern:*

Figure 1:
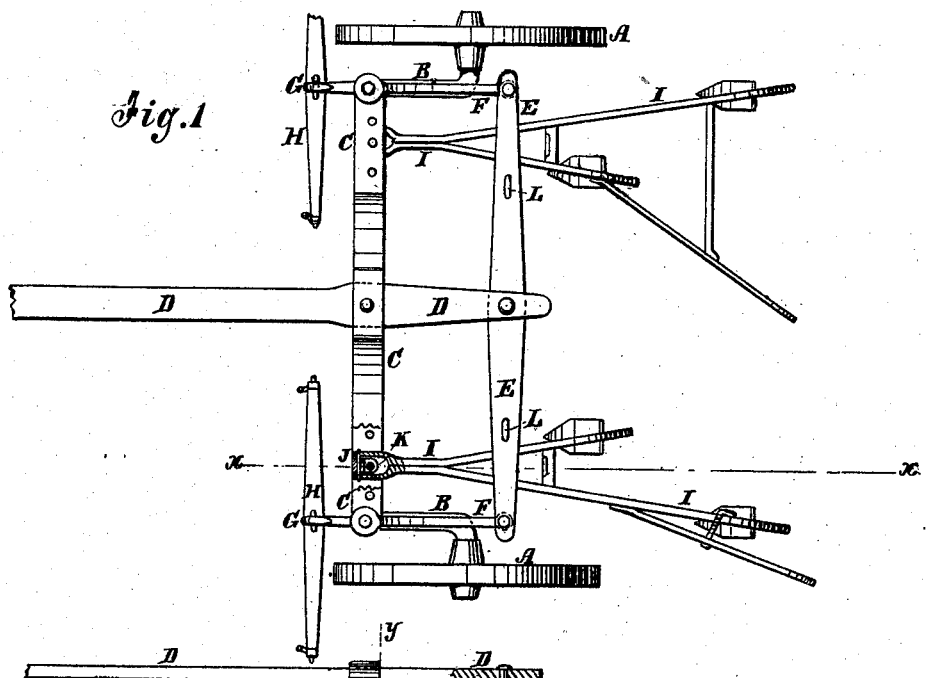
Figure 2:
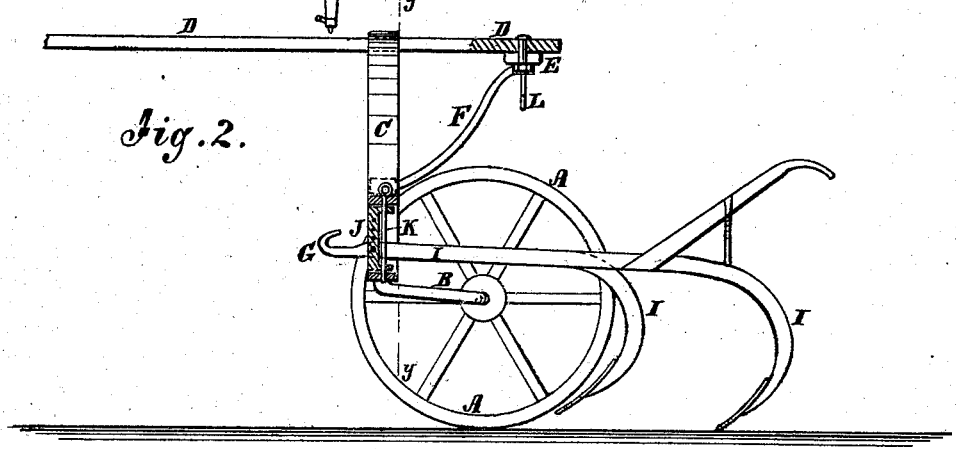
Figure 3:
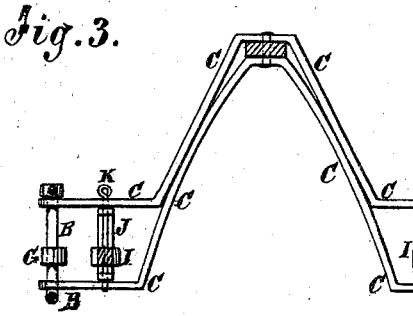

Be it known that we, JAMES F. MATCHET and PERRY W. SMITH, of Paris, in the county of Monroe and State of Missouri, have invented a new and useful Improvement in Wheel-Cultivators, of which the following is a specification:

Figure 1 is a top view of our improved cultivator. Fig. 2 is a vertical longitudinal section of the same taken through the line $x\ x$, Fig. 1. Fig. 3 is a vertical cross-section of the same taken through the line $y\ y$, Fig. 2.

Similar letters of reference indicate corresponding parts.

The invention relates to the improvement of wheel-cultivators, as hereinafter described.

A are the wheels, which revolve upon the journals of the axles B. The axles B at the inner ends of the hubs of the wheels A are bent forward at right angles, and after projecting a short distance are bent upward at right angles. C is the bow, which is made double, and the parts of its ends are horizontal, parallel with each other, and at such a distance apart as to receive the coupling between them. The ends of the double bow C have holes formed through them to receive and work upon the upright parts of the axles B. The middle parts of the bow C are at such a distance apart as to receive the tongue D between them, and allow the said tongue and bow to work freely upon each other and upon the bolt that pivots them to each other. The intermediate parts of the double bow C are close together, and are welded, riveted, or otherwise rigidly connected. To the rear end of the tongue D is pivoted the center of a cross-bar, E, the ends of which are pivoted to the upper and rear ends of the arms F, the lower and forward ends of which are rigidly attached to the upper ends of the upright parts of the axles B. G are the draft-hooks, to which the whiffletrees H are applied, and which are rigidly attached to the upright parts of the axles B, so that the draft-line and the wheels will always be in line with each other, and always parallel with the tongue. I are the cultivator-beams, each of which is made double, and with the rear parts spread apart and curved downward to receive the plow-plates, and provided with cross-bars to keep them in proper relative position, and with a handle to enable them to be conveniently guided. In the forward end of each double beam I is formed a notch, slot, or eye to receive the short upright bar J, to which it is pivoted by a pin, so that the rear parts of the cultivator-beams may have a free vertical movement. Several holes are formed in the upright bar J to receive the pivoting-pin, so that the beam I may be conveniently raised and lowered to adjust the plows to work deeper and shallower in the ground, as may be required. Upon the rear side of the upper and the lower ends of the upright bars J are formed lugs, through which and through the upper and lower arms of the double bow C passes a pin, K, to pivot the said upright bar J to the said arms, so that the rear parts of the beams may have a free lateral movement. Several holes are formed in the arms of the bow C to receive the said pin K, so that the beams I may be conveniently adjusted wider apart or closer together. To the cross-bar E are attached hooks L, upon which the rear parts of the beams I may be hooked to support the plows, away from the ground for convenience in turning and passing from place to place.

Having thus described our invention, we claim as new and desire to secure by Letters Patent—

The double bow C C, tongue D, cross-bar E, and arms F, all pivoted together and moving freely upon each other, in combination with the bent sectional axles B B, as and for the purpose described.

JAMES F. MATCHET.
PERRY W. SMITH.

Witnesses:
JOHN MATCHET,
A. E. GORE.